C. D. MOSHER.
STRAINER AND FILTER ALARM.
APPLICATION FILED JAN. 15, 1921.

1,411,802. Patented Apr. 4, 1922.

Inventor
Charles D. Mosher.
By his Attorney

UNITED STATES PATENT OFFICE.

CHARLES D. MOSHER, OF NEW YORK, N. Y.

STRAINER AND FILTER ALARM.

1,411,802.

Specification of Letters Patent. Patented Apr. 4, 1922.

Application filed January 15, 1921. Serial No. 437,429.

*To all whom it may concern:*

Be it known that I, CHARLES D. MOSHER, a citizen of the United States, residing at New York city, in the county of New York and State of New York, have invented certain new and useful Improvements in Strainer and Filter Alarms, of which the following is a specification, reference being had therein to the accompanying drawing.

My invention relates to improvements in strainer and filter alarms and more particularly has reference to means for automatically indicating or announcing an undue strain upon the filter fabric whereby the bursting of the filter may be obviated, and is in the nature of an improvement upon my previous patent application Serial No. 328,219, in connection with which this improvement is especially adapted for use.

Figure 1:
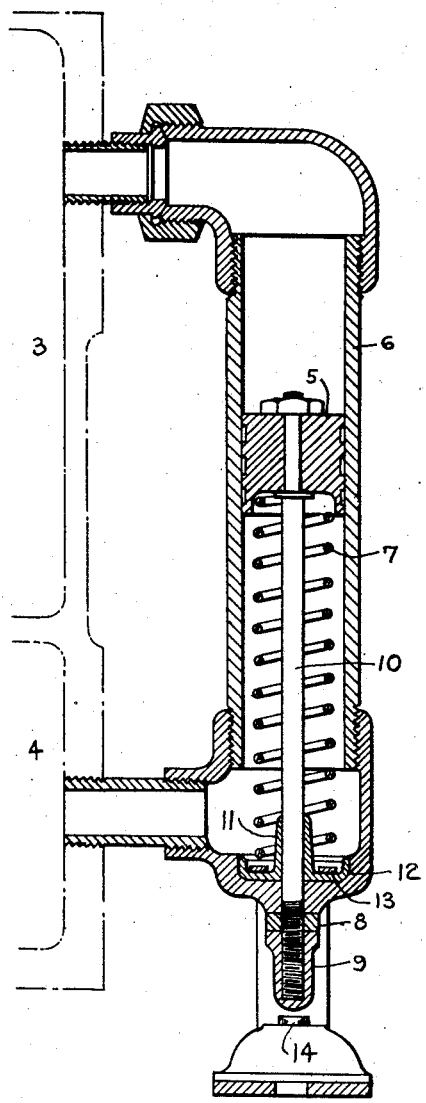
Figure 2:
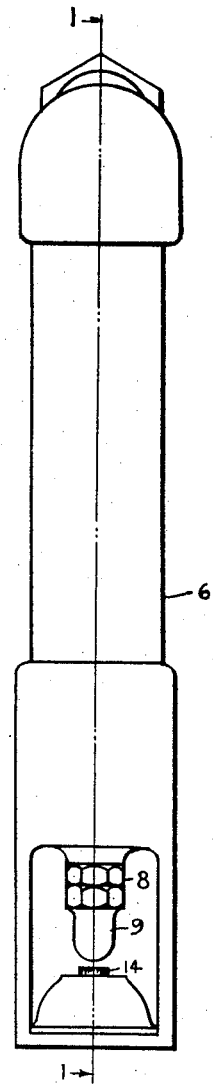

Referring to the accompanying drawings, I have illustrated in Fig. 1 in vertical section, a suitable form of device embodying an application of my invention. Fig. 2 is a view in full outline of said device looking from right to left thereat.

3 indicates the chamber of the filter or strainer from which the oil passes to the chamber 4 as it is being strained, and from which it will be readily understood that any accumulation of grit or foreign matter will naturally set up a back pressure or resistance in the chamber 3. Having determined a safety limit for such back pressure, and having set my device to operate at that pressure, its mode of operation is as follows: The piston 5 in the cylinder 6 is projected upwardly by the spring 7, the tension of which said spring may be adjusted by the nuts 8—9 upon the rod 10 passing through the piston 5 and spring 7. 11 indicates a cup leather packing around the rod 10 seated in the recess 12 in the base of the device as shown, and 13 indicates a suitable washer upon which the spring 7 rests. 14 indicates a push button immediately beneath the head of the nut 9 as shown.

The increased pressure in the chamber 3 due to the clogging of the strainer or filter causes the piston 5 to descend with its rod 10 against the predetermined tension of the spring 7, thereby causing the head of the nut 9 to press upon the electric button 14 or any other suitable form of signaling or recording device.

Of course it will be understood that various modifications may be made in the construction and arrangement of parts without departing from the spirit of the invention as claimed.

I claim:

1. In a strainer or filter of the class described, a tube connecting chambers at opposite sides of the strainer or filter, a piston in said tube adapted to be moved by a differential of pressures in said chambers and means for automatically announcing said movement.

2. In a strainer or filter of the class described, a tube connecting chambers at opposite sides of the strainer or filter, a piston in said tube adapted to be moved by a differential of pressures in said chambers and means for automatically announcing said movement, said piston resiliently opposed to any increase in pressure at the feeding side of said strainer or filter.

3. In a strainer or filter of the class described, a tube connecting chambers at opposite sides of the strainer or filter, a piston in said tube adapted to be moved by a differential of pressures in said chambers said piston having a rod extending through one end of said tube and an electrical push button in the path of movement of said rod.

4. In a strainer or filter of the class described, a tube connecting chambers at opposite sides of the strainer or filter, a piston in said tube adapted to be moved by a differential of pressures in said chambers and means for automatically announcing said movement, said piston resiliently opposed to any increase in pressure at the feeding side of said strainer or filter and means for adjusting the degree of opposition of said piston.

5. In a strainer or filter of the class described, a tube connecting chambers at opposite sides of the strainer or filter, a piston in said tube adapted to be moved by a differential pressures in said chambers said piston having a rod extending through one end of said tube and an electrical push button in the path of movement of said rod, said device being adapted to be detachably connected to said strainer or filter.

In testimony whereof I hereunto affix my signature.

CHARLES D. MOSHER.